United States Patent
Yu et al.

(10) Patent No.: US 12,314,732 B2
(45) Date of Patent: May 27, 2025

(54) CONTINUITY OF SERVICE FOR VIRTUALIZED DEVICE AFTER RESUMPTION FROM HIBERNATION

(71) Applicant: ATI Technologies ULC, Markham (CA)

(72) Inventors: Yuexiang Yu, Markham (CA); Wan Quan Li, Markham (CA); Bokun Zhang, Markham (CA); Min Zhang, Markham (CA); Hing Pong Chan, Markham (CA)

(73) Assignee: ATI Technologies ULC, Markham (CA)

( * ) Notice: Subject to any disclaimer, the term of this patent is extended or adjusted under 35 U.S.C. 154(b) by 49 days.

(21) Appl. No.: 18/080,588

(22) Filed: Dec. 13, 2022

(65) Prior Publication Data

US 2024/0192965 A1 Jun. 13, 2024

(51) Int. Cl.
*G06F 9/4401* (2018.01)
*G06F 9/455* (2018.01)

(52) U.S. Cl.
CPC ........ *G06F 9/4418* (2013.01); *G06F 9/45558* (2013.01); *G06F 2009/45591* (2013.01)

(58) Field of Classification Search
CPC ............... G06F 9/4418; G06F 9/45558; G06F 2009/45591
See application file for complete search history.

(56) References Cited

U.S. PATENT DOCUMENTS

| | | | |
|---|---|---|---|
| 5,682,550 A | 10/1997 | Brown et al. | |
| 8,166,477 B1* | 4/2012 | Tormasov | G06F 9/45558 718/1 |
| 9,223,596 B1* | 12/2015 | Araujo | G06F 9/45558 |
| 9,354,928 B1* | 5/2016 | Buchheit | H04L 12/4625 |
| 10,860,363 B1* | 12/2020 | Gabrielson | G06F 9/45558 |
| 11,494,212 B2* | 11/2022 | Sunku | G06F 9/5077 |
| 11,513,814 B1 | 11/2022 | Luban et al. | |
| 2007/0061558 A1* | 3/2007 | Rothman | G06F 9/4418 713/1 |
| 2008/0104608 A1* | 5/2008 | Hyser | G06F 9/5088 718/105 |
| 2012/0227038 A1* | 9/2012 | Hunt | G06F 9/45558 718/1 |
| 2012/0311572 A1* | 12/2012 | Falls | H04L 67/561 718/1 |
| 2013/0091500 A1* | 4/2013 | Earl | G06F 9/45558 718/1 |
| 2013/0227553 A1* | 8/2013 | Tsirkin | G06F 9/45558 718/1 |
| 2013/0227556 A1* | 8/2013 | Tsirkin | G06F 21/53 718/1 |

(Continued)

*Primary Examiner* — Faisal M Zaman
(74) *Attorney, Agent, or Firm* — Volpe Koenig (57) ABSTRACT

A technique for operating an auxiliary processing device is provided. The technique includes based on a first request specifying a handle received from a client, requesting work be performed via a first auxiliary processing device mapped to the handle; responsive to restoration from hibernation, updating a mapping for the handle to refer to a second auxiliary processing device; and based on a second request specifying the handle received from the client, requesting work be performed via the second auxiliary processing device.

20 Claims, 5 Drawing Sheets

(56) References Cited

U.S. PATENT DOCUMENTS

| | | | | |
|---|---|---|---|---|
| 2013/0232493 | A1* | 9/2013 | Kato | G06F 1/3228 |
| | | | | 718/1 |
| 2014/0281380 | A1* | 9/2014 | Sodhi | G06F 9/30123 |
| | | | | 712/30 |
| 2015/0040127 | A1* | 2/2015 | Dippenaar | G06F 9/4856 |
| | | | | 718/1 |
| 2015/0227192 | A1* | 8/2015 | Kruglick | G06F 1/3296 |
| | | | | 713/323 |
| 2015/0277545 | A1 | 10/2015 | Flowers | |
| 2016/0139948 | A1* | 5/2016 | Beveridge | G06F 9/542 |
| | | | | 718/1 |
| 2016/0378164 | A1* | 12/2016 | Tsuji | G06F 9/4881 |
| | | | | 718/107 |
| 2017/0041187 | A1* | 2/2017 | Nelson | H04L 41/0893 |
| 2018/0095799 | A1* | 4/2018 | Criou | G06F 9/5044 |
| 2018/0260251 | A1* | 9/2018 | Beveridge | G06F 9/5027 |
| 2018/0329757 | A1* | 11/2018 | Patgar | G06F 9/45558 |
| 2019/0324930 | A1* | 10/2019 | Liu | G06F 13/20 |
| 2020/0133704 | A1* | 4/2020 | Habkost | G06F 9/45508 |
| 2020/0264917 | A1* | 8/2020 | Kraemer | G06F 13/24 |
| 2021/0149705 | A1* | 5/2021 | Ogawa | G06F 9/4881 |
| 2022/0027190 | A1* | 1/2022 | Hay | G06F 9/5077 |
| 2022/0035957 | A1* | 2/2022 | O'Brien, III | G06F 11/1441 |
| 2023/0153140 | A1* | 5/2023 | Pfefferle | G06F 9/45558 |
| | | | | 718/1 |
| 2024/0004680 | A1* | 1/2024 | Jiang | G06F 11/3409 |
| 2024/0086234 | A1* | 3/2024 | Park | G06F 9/4881 |

* cited by examiner

CONTINUITY OF SERVICE FOR VIRTUALIZED DEVICE AFTER RESUMPTION FROM HIBERNATION

BACKGROUND

Computer virtualization represents a decoupling of physical hardware from logical devices, which provides flexibility for the use of the physical hardware capabilities. Improvements to operations related to virtualization are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for operating an auxiliary processing device is provided. The technique includes based on a first request specifying a handle received from a client, requesting work be performed via a first auxiliary processing device mapped to the handle; responsive to restoration from hibernation, updating a mapping for the handle to refer to a second auxiliary processing device; and based on a second request specifying the handle received from the client, requesting work be performed via the second auxiliary processing device.

Figure 1:
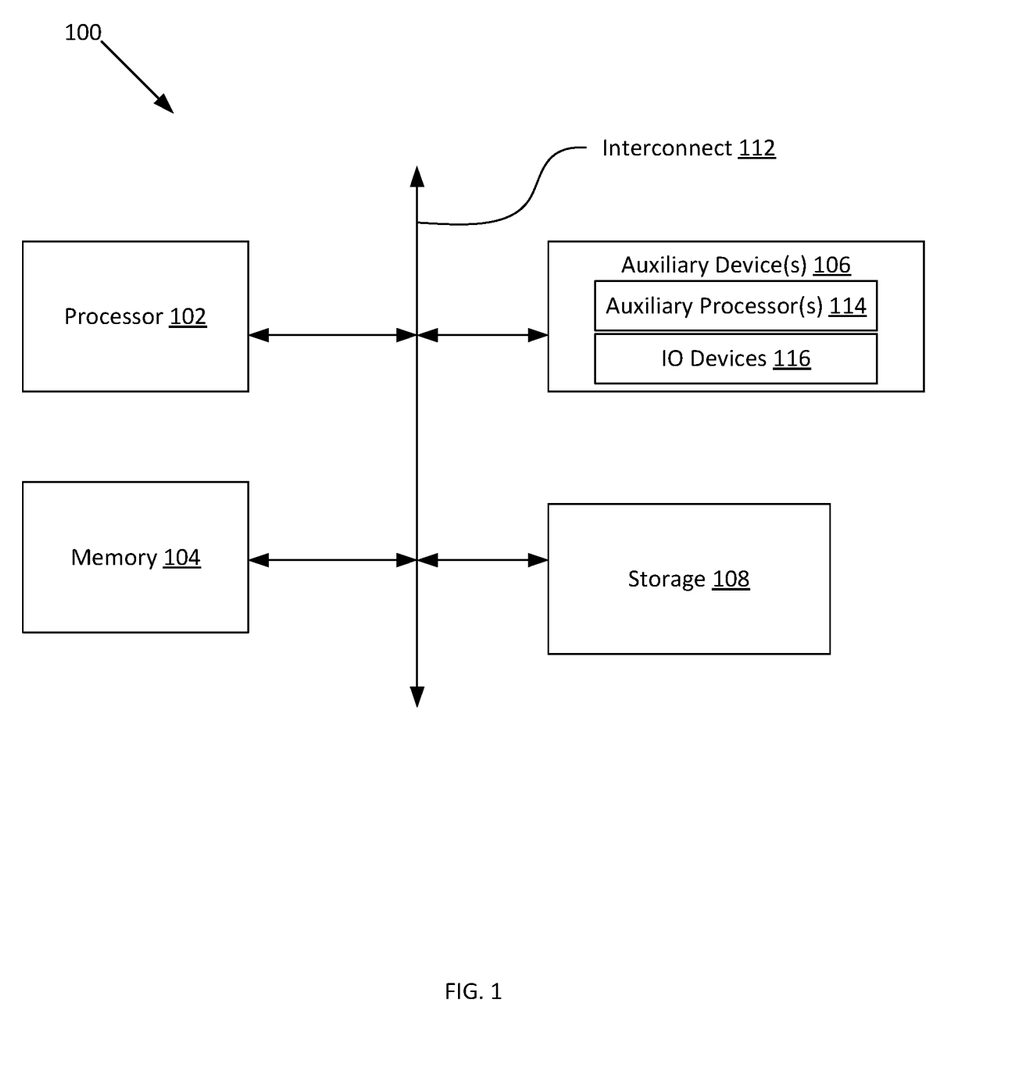
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more IO devices 116 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

Figure 2:
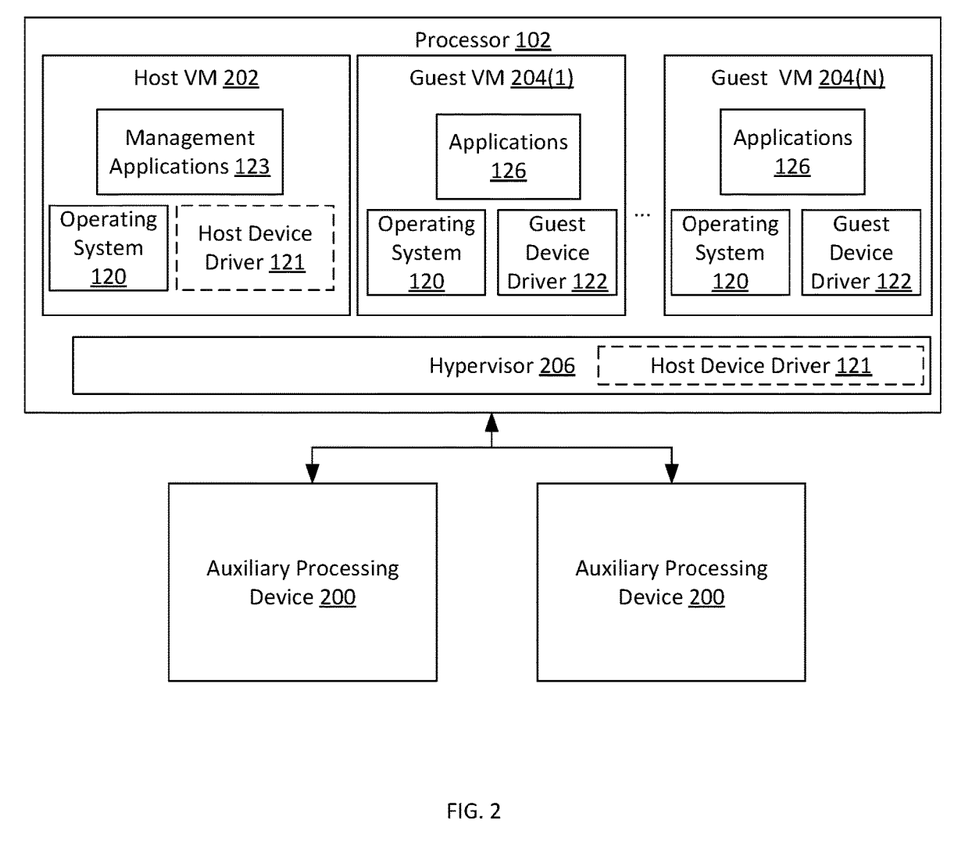
FIG. 2 illustrates details of the device related to virtualization, according to an example.

FIG. 2 illustrates details of the device 100 related to virtualization, according to an example. The processor 102 supports multiple virtual machines, which are virtualized instances of a real computing device. A specialized host virtual machine 202, is not a "general purpose" VM like the guest VMs 204, but instead performs support functionality for virtualization of the device 100 for the guest VMs 204. A hypervisor 206 provides virtualization support for the virtual machines, which includes a wide variety of functions such as managing resources assigned to the virtual machines, spawning and killing virtual machines, handling system calls, managing access to peripheral devices, managing memory and page tables, and various other functions.

A set of auxiliary processing devices 200 are present. In some examples, the auxiliary processing devices 200 are auxiliary processors 114. In some examples, the auxiliary processing devices 200 are media processors, such as video encoders, video decoders, and/or other media processors. The hypervisor 206 or host VM 202 configures the one or more auxiliary processing devices 200 to communicate with one or more guest virtual machines 204, for example, by linking guest virtual machines 204 to auxiliary processing devices. The guest virtual machines 204 communicate with the auxiliary processing devices 200 via one or more virtual functions. A virtual function is an addressing parameter in an interface scheme such as peripheral component interconnect express (PCIe) that implements or is compatible with single root input/output virtualization (SRI-IOV). To communicate using a virtual function, a guest VM 204 performs communication that explicitly or implicitly identifies a particular virtual function of a particular auxiliary processing device 200. In some examples, a routing mechanism such as an input output memory management unit ("IOMMU") routes the communication to the appropriate auxiliary processing device 200 and virtual function.

In some examples, at initialization time, a virtual machine 204 causes a particular guest physical address to be linked to a particular virtual function of a particular auxiliary processing device 200. In some such examples, the virtual machine 204 configures the auxiliary processing device 200 to link the guest physical address to the virtual function. Subsequently, when the virtual machine 204 performs operations specifying the guest physical address, such memory transactions are routed (e.g., by an IOMMU) to the specified auxiliary processing device 200 and virtual function.

The host VM 202 and the guest VMs 204 have operating systems 120. The host VM 202 has management applications 123 and a host device driver 121. The guest VMs 204 have applications 126, an operating system 120, and a guest device driver 122. These elements control various features of the operation of the processor 102 and the auxiliary processing device(s) ("APDs") 200.

As stated above, the host VM 202 configures aspects of virtualization in the APDs 200 for the guest VMs 204. Thus the host VM 202 includes an operating system 120 that supports execution of other elements such as management applications 123 and a host device driver 121. In one example, the host device driver 121 manages parameters related to the mechanism for sharing the auxiliary processing devices 200 among the different VMs, controlling various parameters including work requested by particular VMs 204 is performed on the auxiliary processing device and which auxiliary processing device 200 is assigned to which guest VM 204.

Although the host device driver 121 is described as being included within the host VM 202, in other implementations, the host device driver 121 is included in the hypervisor instead 206. In such implementations, the host VM 202 may not exist and functionality of the host VM 202 may be performed by the hypervisor 206.

The guest VMs 204 include an operating system 120, a guest device driver 122, and applications 126. The operating system 120 is any type of operating system that could execute on processor 102. The guest device driver 122 is a "native" driver for the APD 200 in that the guest device driver 122 controls operation of one or more auxiliary processing devices 200 for the guest VM 204 on which the guest device driver 122 is running, sending tasks to an auxiliary processing device 200 for processing. The native driver may be an unmodified or modified version of a device driver for an auxiliary processing device 200 that would exist in a bare-metal non-virtualized computing system.

The operating systems 120 of the host VM 202 and the guest VMs 204 perform standard functionality for operating systems in a virtualized environment, such as communicating with hardware, managing resources and a file system, managing virtual memory, managing a network stack, and many other functions. The guest device driver 122 controls operation of an auxiliary processing device 200 for any particular guest VM 204 by, for example, providing an application programming interface ("API") to software (e.g., applications 126) to access various functionality of the APD 200. For any particular guest VM 204, the guest device driver 122 controls functionality on the APD 200 related to that guest VM 204, and not for other VMs.

The host device driver 121 manages the mapping between auxiliary processing devices 200 and guest VMs 204. More specifically, there are multiple auxiliary processing device 200, and it is possible that fewer than all auxiliary processing devices 200 are visible to any particular guest VM 204. In an example, the processor 102 executes four guest VMs 204 and the device 100 includes two auxiliary processing devices 200. In this example, the host device driver 121 makes one auxiliary processing device 200 visible to a first and second guest VM 204 and not a third and fourth guest VM 204 and makes another auxiliary processing device 200 visible to the third and fourth guest VM 204 and not the first and second guest VM 204. A guest VM 204 is unable to access an auxiliary processing device 200 if that auxiliary processing device 200 is not visible to the guest VM 204 and the guest VM 204 is able to access an auxiliary processing device 200 if that auxiliary processing device 200 is visible to that guest VM 204.

The hypervisor 206 assigns auxiliary processing devices 200 to guest VMs 204. In some examples, this assignment occurs for an initialization period for a VM 204, such as during startup time for the VM 204 (e.g., when a VM 204 is initially powered on and the operating system conducts a start-up sequence). The hypervisor 206 determines which auxiliary processing devices 200 to assign to any particular guest VM 204 in any technically feasible manner. In an example, the hypervisor 206 assigns, to each guest VM 204, one auxiliary processing device 200. In some such examples, the hypervisor 206 assigns the auxiliary processing devices 200 evenly. In other such examples, the hypervisor 206 assigns the auxiliary processing devices 200 according to the processing capacities of the auxiliary processing devices 200. Any other technically feasible technique could be used.

The result of assigning an auxiliary processing device 200 to a guest VM 204 is that the guest VM 204 is able to access that processing device 200. An entity such as an application 126 or other entity of a VM 204 accesses the processing device 200 via the guest device driver 122. An application 126 identifies a particular auxiliary processing device 200 to access based on an auxiliary processing device handle provided by the guest device driver 122. In an example, the application generates a request for processing by an auxiliary processing device via the auxiliary processing device handle. The application sends this request to the guest device driver 122, which includes a mapping from the auxiliary processing device handle to the physical auxiliary processing device 200 assigned to the guest VM 204. The guest device driver 122 transmits a request to the auxiliary processing device 200 corresponding to the virtual function based on this mapping, and the auxiliary processing device 200 processes that request.

Guest VMs 204 are capable of performing hibernation. Hibernation includes backing up working state of the guest VM 204 and powering down the guest VM 204. The state that is backed up is sufficient to restore the operating conditions of the guest VM 204 once powered back up. These operating conditions include the applications that are currently executing, the state of those applications (for example, the document that is open, the location in that document that is currently being viewed, and/or other data loaded into memory for the application), the state of the operating system, the contents of memory, the state of registers, and other state associated with the guest VM 204.

The VMs 204 are capable of being restored from hibernation. To restore a VM 204 from hibernation, the hypervisor 206 starts up the guest 204 VM with the state that was saved for that guest VM 204. Thus, the applications and/or other software regains the state that was saved when hibernation occurred. In the process of restoration, the hypervisor 206 maps an auxiliary processing device 200 to the guest VM 204. It is possible that the auxiliary processing device 200 that is provided to the restored guest VM 204 is not the same auxiliary processing device 200 that the guest VM 204 was using when the guest VM 204 underwent hibernation.

For example, it is possible that the operating conditions of the device 100 changed such that the auxiliary processing device 200 mapped to the guest VM 204 is used by too many guest VMs 204 and that the hypervisor 206 thus determined that the guest VM that is being restored should be mapped to a different auxiliary processing device 200. For this reason, the guest device driver 122 performs operations to ensure continuity of the service provided by the auxiliary processing devices 200. Such operations are now described in greater detail below.

Figure 3:
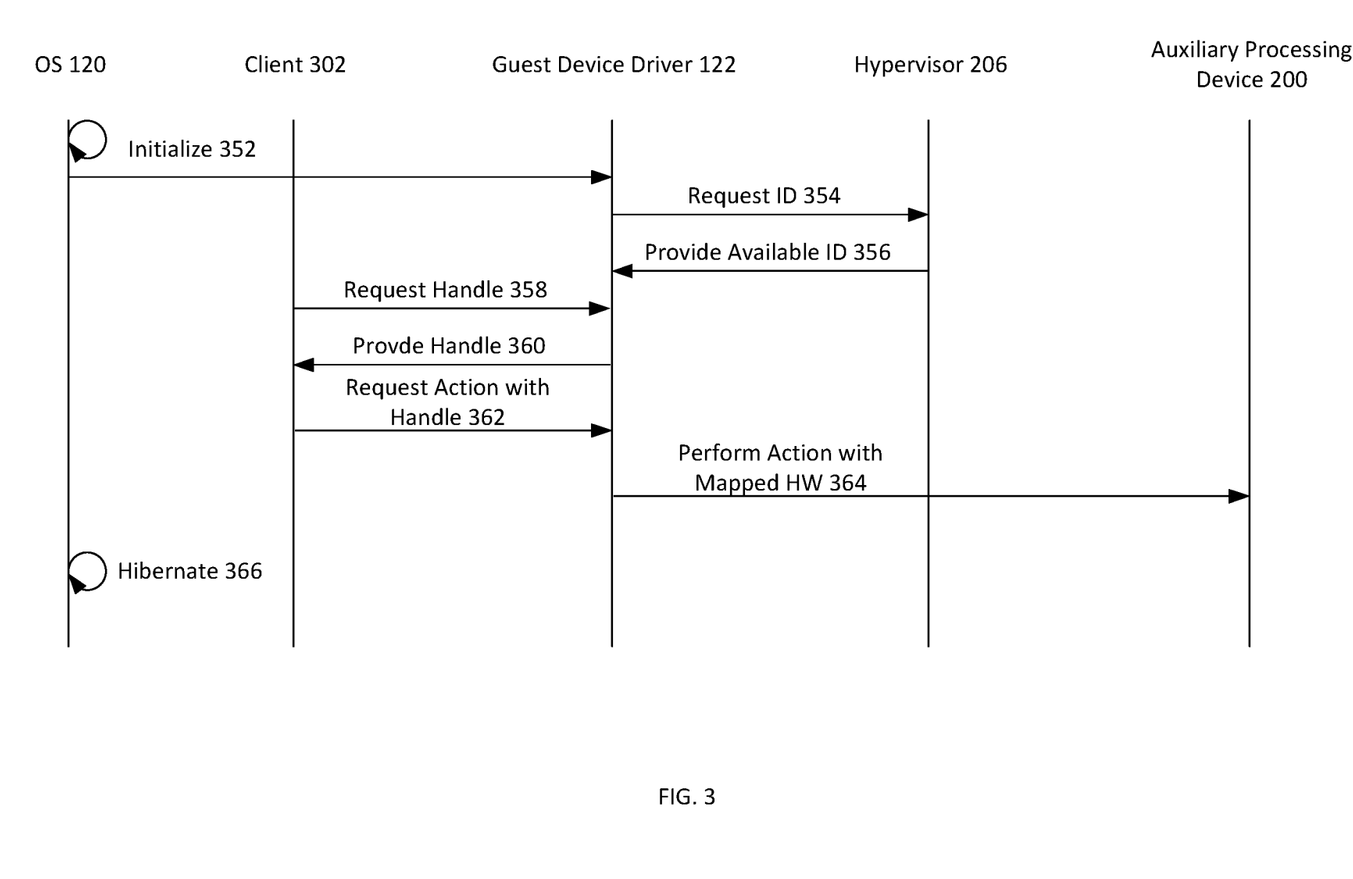
FIG. 3 illustrates a set of operations before hibernation, according to an example.

FIG. 3 illustrates a set of operations before hibernation, according to an example. An operating system ("OS") 120 of a guest VM 204 performs initialization 352. This initialization includes a start-up sequence in which foundational software such as device drivers is loaded, hardware is initialized, and other operations are performed. The initialization 352 includes causing the guest device driver 122 for an auxiliary processing device 200 to be initialized. As part of this initialization, the guest device driver 122 requests available hardware information (request an ID—step 354) for the auxiliary processing device 200. The requested information includes what auxiliary processing device 200 is available for use by the guest VM 204 that is being initialized. The hypervisor 206 provides this information in step 356 to the guest device driver 122.

When a client 302 (which is an application 126 or other entity) wishes to perform work with the auxiliary processing device 200, the client 302 requests a handle 358 for the auxiliary processing device 200 from the guest device driver 122. The guest device driver 122 creates or retrieves such a handle at operation 360 and provides the handle to the client 302. The client 302 requests an action to be performed on the auxiliary processing device 200 with the handle at operation 362. The guest device driver 122 requests the action to be performed on the auxiliary processing device 200 associated with the handle at operation 364. After a period of time, the operating system 120 causes the guest VM 204 to hibernate at operation 366.

Figure 4:
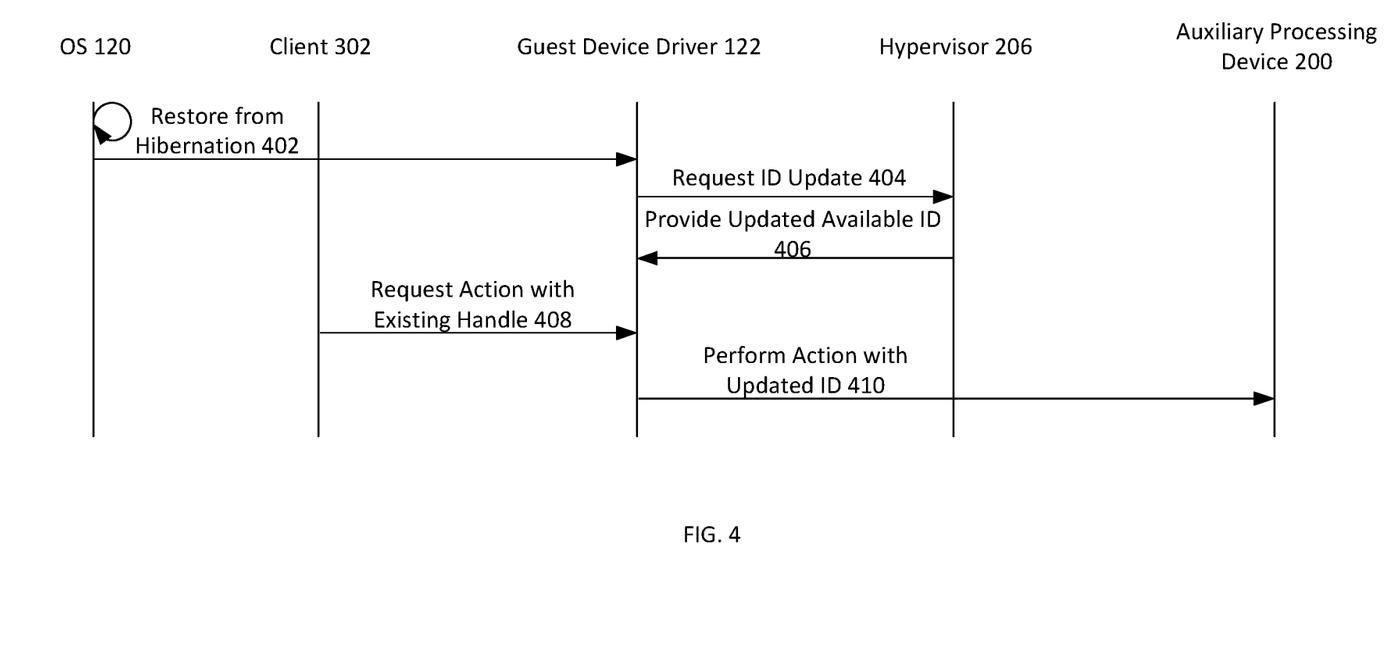
FIG. 4 illustrates a set of operations for restoring operation after hibernation, and performing actions with the auxiliary processing device, according to an example.

FIG. 4 illustrates a set of operations for restoring operation after hibernation, and performing actions with the auxiliary processing device 200, according to an example. The operating system 120 is triggered to restore from hibernation 402. In some examples, a hypervisor 206 or other entity causes an initial startup sequence, powering on the guest VM 204, which triggers the operating system 120 of the VM 204 to begin the restoration 402. Part of the restoration includes the hypervisor 206 assigning hardware resources to the guest VM 204. Specifically, the hypervisor 206 selects an auxiliary processing device 200 to assign to the guest VM 204. The auxiliary processing device 200 that is assigned to the guest VM 204 may be different than the auxiliary processing device 200 that was assigned to the guest VM 204 prior to the hibernation.

In the course of restoration, which includes loading state for the OS 120, applications 126, and other operations, the OS 120 triggers the guest device driver 122 to perform operations for restoring from hibernation. As part of this operation, the guest device driver 122, at step 404, requests a new auxiliary processing device 200. In some examples, this request is made to the hypervisor 206. The purpose of the request is to update the information stored by the guest device driver 122 regarding which auxiliary processing device 200 is mapped to the guest VM 204. More specifically, as described above, the hypervisor 206 selects a new auxiliary processing device 200 for the guest VM 204 after restoration from hibernation, and the new auxiliary processing device 200 can be different from the auxiliary processing device 200 that was assigned to the guest VM 204 before hibernation. The hypervisor 206 provides the updated auxiliary processing device to the guest device driver 122 in operation 406. The guest device driver 122 updates the mapping between the handle provided to the client 302 and the auxiliary processing device, in operation 406. This handle was restored to the client 302 as part of the restore from hibernation.

After restoration from hibernation, the client 302 transmits a request to the guest device driver 122 for an action to be performed by the auxiliary processing device 200 with the existing handle restored from hibernation, in operation 408. The guest device driver 122 requests the action be performed by the auxiliary processing device 200 identified the mapping for that handle, in operation 410.

Figure 5:
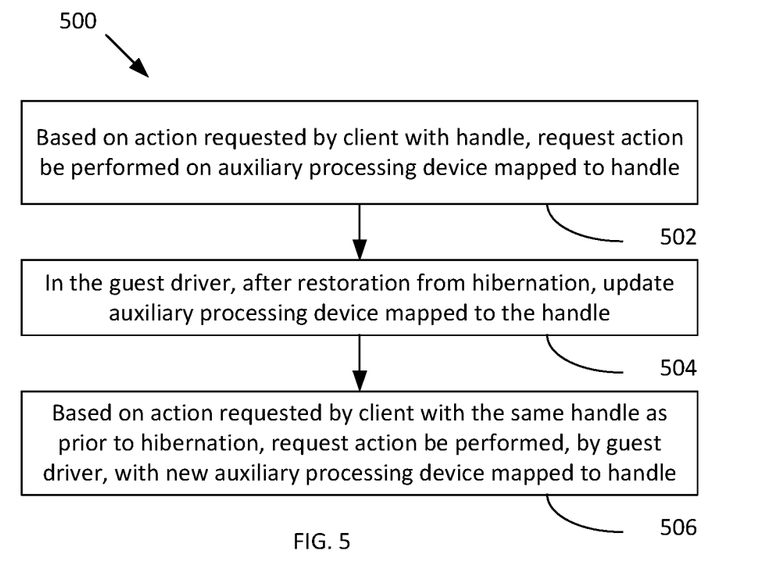
FIG. 5 is a flow diagram of a method for operating an auxiliary processing device in a virtualized environment, according to an example.

FIG. 5 is a flow diagram of a method 500 for operating an auxiliary processing device 200 in a virtualized environment, according to an example. Although described with respect to the system of FIGS. 1-4, those of skill in the art will understand that any system configured to perform the steps of the method 500 in any technically feasible order falls within the scope of the present disclosure.

At step 502, a guest device driver 122 requests an action be performed by an auxiliary processing device 200. The guest device driver 122 performs this action in response to a client 302 request for the auxiliary processing device 200 to perform the action. The client 302 uses a handle to specify the auxiliary processing device 200 that is to perform the action. The guest device driver 122 stores a mapping that maps the handle to an auxiliary processing device 200. The auxiliary processing device is assigned to the guest VM 204 by, for example, a hypervisor 206, when the guest VM 204 starts up or at another time. In an example, at initialization, the guest device driver 122 requests, from the hypervisor 206, an available auxiliary processing device 200. The hypervisor 206 selects one of multiple auxiliary processing devices 200 available to the device 100 and transmits an identification of that auxiliary processing device 200 to the guest device driver 122. The guest device driver 122 associates the auxiliary processing device 200 with the handle provided by the client 302 so that the guest device driver 122 is able to transmit the request identifying the handle to the auxiliary processing device 200 assigned to the virtual machine 204. The auxiliary processing device 200 processes the request in any technically feasible manner.

At step 504, after hibernation has occurred, and in the course of restoration from hibernation, the guest device driver 122 updates the auxiliary processing device 200 mapped to the handle in use by the client 302. To perform this update, the operating system 120 or other entity informs the guest device driver 122 that restoration from hibernation is occurring. In response, the guest device driver 122 requests an update to the auxiliary processing device 200 that is mapped to the handle. The hypervisor 206 provides an updated auxiliary processing device 200 to the guest device driver 122, which updates the auxiliary processing device 200 mapped to the handle. The updated auxiliary processing device 200 can be the same auxiliary processing device 200 that was mapped to the guest VM 204 prior to hibernation or a different auxiliary processing device 200 as was mapped to the guest VM 204 prior to hibernation.

Updating the auxiliary processing device that is assigned to the handle can be performed by the guest device driver 122 in any technically feasible manner. In some examples, the hypervisor 206 provides an updated addressing parameter (e.g., guest physical address, virtual function, physical function, or other addressing parameter) and the guest device driver 122 updates the mapping to point to the new addressing parameter. In some examples, the hypervisor 206 updates a mapping between a guest physical address that the guest device driver 122 has mapped to the handle and a system physical address such that the system physical address points to the newly assigned auxiliary processing device 200. In some examples, if the hypervisor 206 provides a new physical function and/or virtual function to the guest device driver 122, the guest device driver 122 updates the mapping to be between the handle used by the client 302 and the new physical function and/or virtual function.

At step 506, the guest driver 122 requests an action be performed with an auxiliary processing device 200, in response to a request by a client 302. The client specifies a handle and the guest device driver 122 requests the action be performed with the auxiliary processing device 200 mapped to the handle. The specified handle is the same handle specified in step 502. It is possible that the guest driver has changed which auxiliary processing device 200 is mapped to that handle, and thus it is possible for the guest device driver 122 to provide the request from the client 302 to a different auxiliary processing device 200 than the processing device 200 to which the request is provided in step 502.

Herein, where it is stated that a hypervisor 206 performs an action, this can be interpreted as meaning that the host device driver 121 performs that action.

The elements in the figures are embodied as, where appropriate, software executing on a processor, a fixed-function processor, a programmable processor, or a combination thereof. The processor 102, interconnect 112, memory 104, storage 108, various auxiliary devices 106 (including auxiliary processors 114 and IO devices 116), and auxiliary processing devices 200 clients 212 include at least some hardware circuitry and, in some implementations, include software executing on a processor within that component or within another component.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing processing operations, the method comprising:
   issuing a first request, by a first virtual machine executing on a first processor, for work to be performed via a first auxiliary processing device, wherein the first request specifies a handle that is mapped to the first auxiliary processing device, and wherein the first auxiliary processing device is separate from the first processor;
   hibernating and restoring from hibernating, the first virtual machine;
   responsive to the restoring from hibernating, updating a mapping for the handle to refer to a second auxiliary processing device wherein the handle remains the same prior to the hibernation and subsequent to the hibernation; and
   issuing a second request, by the first virtual machine, for work to be performed via the second auxiliary processing device, wherein the second request specifies the handle.

2. The method of claim 1, wherein updating the mapping comprises:
   requesting an identifier for an updated auxiliary processing device from a hypervisor.

3. The method of claim 2, further comprising:
   based on usage characteristics of a set of auxiliary processing devices, selecting, by the hypervisor, the second auxiliary processing device.

4. The method of claim 1, wherein the first request and the second request are issued from a client executing in the first virtual machine.

5. The method of claim 4, wherein the updating is performed by a device driver executing in the first virtual machine.

6. The method of claim 4, wherein hibernation includes saving state of the first virtual machine and powering down the first virtual machine.

7. The method of claim 6, wherein restoration from hibernation includes powering up the first virtual machine and restoring the state of the first virtual machine.

8. The method of claim 1, wherein the first auxiliary processing device comprises a video encoder engine or a video decoder engine.

9. The method of claim 1, wherein a client that generates the first request and the second request comprises an application.

10. A device for performing processing operations, the device comprising:
    a first auxiliary processing device;
    a second auxiliary processing device; and
    a processor configured to:
    issue a first request, by a first virtual machine executing on the processor, for work be performed via the first auxiliary processing device, wherein the first request specifies a handle that is mapped the first auxiliary processing device, and wherein the first auxiliary processing device is separate from the processor;
    hibernate and restore from hibernating, the first virtual machine;
    responsive to the restoring from hibernating, update a mapping for the handle to refer to the second auxiliary processing device, wherein the handle remains the same prior to the hibernation and subsequent to the hibernation; and issue a second request, by the first virtual machine, for work to be performed via the second auxiliary processing device, wherein the second request specifies the handle.

11. The device of claim 10, wherein updating the mapping comprises:

requesting an identifier for an updated auxiliary processing device from a hypervisor.

12. The device of claim 11, wherein the processor is further configured to:

based on usage characteristics of a set of auxiliary processing devices, select, by the hypervisor, the second auxiliary processing device.

13. The device of claim 10, wherein the first request and the second request are issued from a client configured to execute in the first virtual machine.

14. The device of claim 13, wherein the updating is performed by a device driver configured to execute in the first virtual machine.

15. The device of claim 13, wherein hibernation includes saving state of the first virtual machine and powering down the first virtual machine.

16. The device of claim 15, wherein restoration from hibernation includes powering up the first virtual machine and restoring the state of the first virtual machine.

17. The device of claim 10, wherein the first auxiliary processing device comprises a video encoder engine or a video decoder engine.

18. The device of claim 10, wherein a client that generates the first request and the second request comprises an application.

19. A non-transitory computer-readable medium storing instructions that, when executed by a processor, cause the processor to perform operations comprising:

issuing a first request, by a first virtual machine executing on a first processor, for work be performed via a first auxiliary processing device, wherein the first request specifies a handle that is mapped to the first auxiliary processing device, and wherein the first auxiliary processing device is separate from the first processor;

hibernating and restoring from hibernating, the first virtual machine;

responsive to the restoring from hibernating, updating a mapping for the handle to refer to a second auxiliary processing device, wherein the handle remains the same prior to the hibernation and subsequent to the hibernation; and issuing a second request, by the first virtual machine, for work to be performed via the second auxiliary processing device, wherein the second request specifies the handle.

20. The non-transitory computer-readable medium of claim 19, wherein updating the mapping comprises:

requesting an identifier for an updated auxiliary processing device from a hypervisor.

* * * * *